No. 686,987. Patented Nov. 19, 1901.
J. A. PAUTASSO.
ROLL CAMERA.
(Application filed Dec. 7, 1900.)
(No Model.)

WITNESSES:
Harry Krug
Russell M. Everett

INVENTOR:
Jean A. Pautasso,
BY
Drake & Co.
ATTORNEYS.

UNITED STATES PATENT OFFICE.

JEAN ANTOINE PAUTASSO, OF GENEVA, SWITZERLAND.

ROLL-CAMERA.

SPECIFICATION forming part of Letters Patent No. 686,987, dated November 19, 1901.

Application filed December 7, 1900. Serial No. 39,032. (No model.)

*To all whom it may concern:*

Be it known that I, JEAN ANTOINE PAUTASSO, a subject of the King of Italy, residing at Geneva, in the canton of Geneva, Switzerland, have invented certain new and useful Improvements in Roll-Cameras; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The objects of the present invention are to provide a roll-camera wherein the actions of unrolling and reeling up the film are produced in an entirely automatic and continuous manner by the simple movements of opening and closing the camera, to secure an exact and uniform movement of the film, and to obtain other advantages and results, some of which may be referred to hereinafter in connection with the description of the working parts.

The invention consists in the improved photographic camera and in the arrangements and combinations of parts thereof, as will be hereinafter set forth, and finally embraced in the clauses of the claim.

Figure 1:
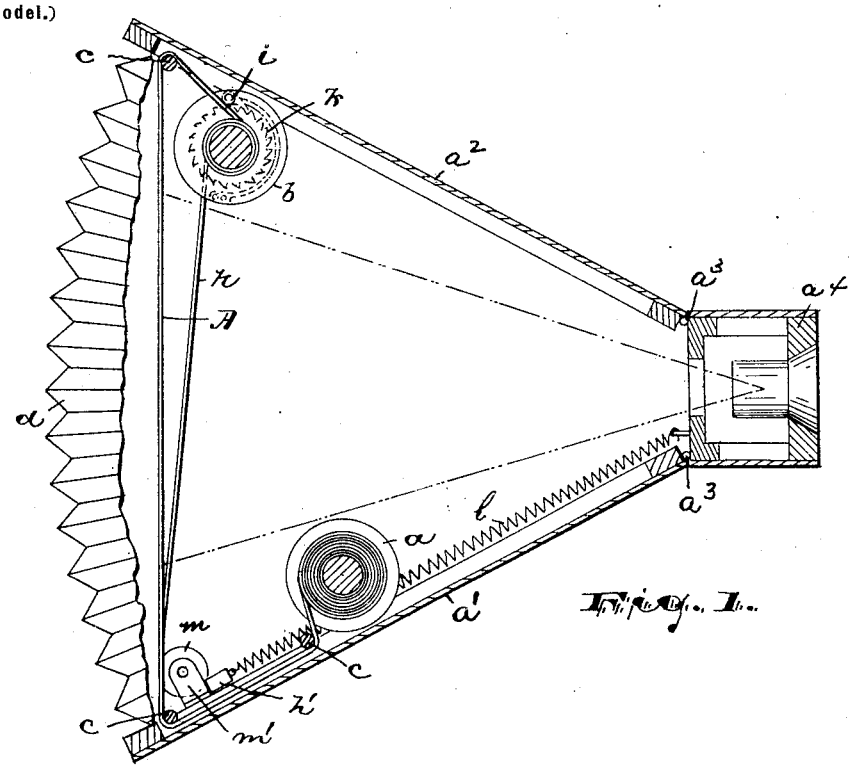
Figure 2:
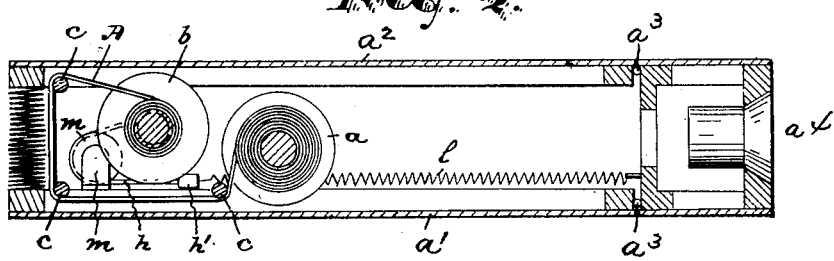
Figure 3:
Figure 4:
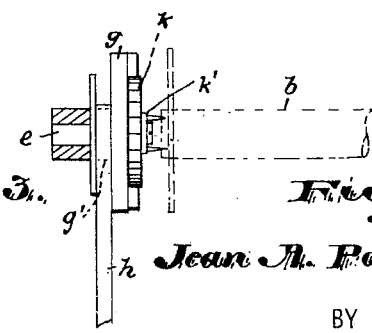

Referring to the accompanying drawings, in which like letters of reference indicate corresponding parts in each of the several views, Figure 1 is a sectional view showing the improved roll-camera in an open position. Fig. 2 is a similar view, the camera being closed. Figs. 3 and 4 are details relating to the mechanism for turning the receiving-roll.

In the construction shown the spool or roll $a$ for the photographic film A is attached to a leaf or section $a'$ of the camera-casing, and the receiving-roll $b$, upon which the said photographic film is wound or rolled up after exposure, is similarly arranged upon the other leaf or section $a^2$ in such a manner that in opening out the camera or moving said sections on their hinges $a^3$ away one from the other the said film A is unrolled. Guide-rolls $c\ c\ c$ are suitably arranged within the camera-casing, over which the said film A is carried from the feeding-roll $a$ to the receiving or take-up roll $b$, two of said guide-rolls being arranged oppositely on the inner sides of the leaves $a'\ a^2$, near their free extremities or edges, so that when said leaves or sections are opened apart, as in Fig. 1, the film will lie in the focal plane of the lens near the bellows back $d$ of the camera. Said bellows back $d$ connects the sections $a'\ a^2$ at three sides of the camera casing or housing. The lens or board closes the fourth side of the casing or housing.

Both the take-up or receiving roll and feeding-rolls are supported by appropriate bearings fixed upon the side leaves or sections $a'\ a^2$ of the camera and of a construction such that the rolls can easily be put in place and withdrawn. Said leaves or sections $a'\ a^2$ are hinged to a lens box or board $a^4$, which serves as a third section of the camera casing or housing.

To roll up the film, one of the bearings of the receiving-roll $b$ is provided with a spring-barrel $g$, loosely mounted upon a shaft $e$ and having a hub $g'$, Fig. 4, to which a band $h$ is fixed at one of its extremities, the other extremity of the band being attached to the opposite section of the camera. This band $h$ is rolled up on the hub $g'$ when the camera is closed and is unrolled when the two sections or leaves of the camera-casing are drawn apart. This unrolling action of the band $h$ arms or winds up the spring-barrel $g$, which thus is brought into condition to serve thereafter as the moving power for rolling up the film in the act of closing the camera. Upon the spring-barrel $g$ is arranged a spring catch or pawl $i$, which engages a ratchet-wheel $k$, fast to or integral with a roll-holder $k'$, to which the receiving-roll $b$ is secured. This roll-holder is loose upon the shaft $e$, and the spring-catch $i$ is arranged in such a way that it slides over the ratchet-wheel when the spring-barrel is wound up by the band $h$ during the opening movement of the camera when the receiving-roll remains stationary. This roll only turns to reel up the film when the tension upon the band $h$ is released in closing the camera. At this moment the catch $i$ engages the ratchet-wheel $k$, and the receiving-roll $b$ is thus made to turn with the spring-barrel. Thus in drawing the two sections $a'\ a^2$ of the camera-casing apart the film and band $h$ are unrolled and the spring-barrel $g$ wound up, and after an exposure of the film in closing the camera the spring-barrel unwinds and turns the receiving-roll to reel up the film.

The diameter of the receiving-roll grows as the film is wound thereon. The receiving-roll $b$ therefore makes less and less revolutions after each successive winding, so that the band $h$ would not be completely wound if attached at $h'$ to a fixture after the first exposure. To take up the slack in the band $h$, its end $h'$ may be attached to a spring $l$, as shown in Figs. 1 and 2, where the band $h$ is carried over a pulley $m$. The power of the spring $l$ is inferior to the force of the spring-barrel $g$, so that the former is drawn out in opening the camera until the end $h'$ of the band $h$ is arrested by the support $m'$, when the band is retained and the spring-barrel begins to wind up. By this arrangement the latter is always only wound up just sufficiently to reel up the film after each exposure, and the force of the spring-barrel remains constant from the beginning to the last portion of film to be reeled up.

Having thus described the invention, what I claim as new is—

1. A roll-camera comprising two hinged sections connected by a bellows on three sides and by a lens-box, the film paying out and receiving rolls each secured to one of said parts, a spring-barrel in connection with the receiving-roll and a flexible band attached to the said spring-barrel at one end and to a spring attached to the camera-casing at the other end, substantially as set forth.

2. The improved photographic camera comprising two hinged sections connected by a bellows-like connection, at three sides and by a lens-board at the fourth, a take-up and a pay-out roll attached to the said sections and adapted to move away one from the other when said sections are opened away one from the other, a spring-barrel and its band, and a spring $l$, attached to the end of said band opposite the end attached to said spring-barrel, the said spring $l$, being weaker than the power stored in said barrel, substantially as set forth.

In testimony that I claim the foregoing I have hereunto set my hand this 3d day of November, 1900.

JEAN ANTOINE PAUTASSO.

Witnesses:
R. SOLLERGER,
L. H. MUNIORY.